United States Patent [19]

Saito et al.

[11] Patent Number: 4,838,116
[45] Date of Patent: Jun. 13, 1989

[54] CRANK

[75] Inventors: Yasuo Saito, Fujisawa; Tadashi Ozaki, Yokosuka; Isao Masuda, Tachikawa, all of Japan

[73] Assignee: Kioritz Corporation, Tokyo, Japan

[21] Appl. No.: 232,785

[22] Filed: Aug. 16, 1988

[30] Foreign Application Priority Data

Aug. 31, 1987 [JP] Japan ................. 62-214992

[51] Int. Cl.⁴ ............................................. F16C 3/04
[52] U.S. Cl. ........................................ 74/595; 74/597
[58] Field of Search ............ 74/579 E, 579 R, 595, 74/596, 597; 29/156.5 A; 123/197 AB

[56] References Cited

U.S. PATENT DOCUMENTS

| | | | |
|---|---|---|---|
| 4,359,913 | 11/1982 | Mahlke | 74/579 E |
| 4,549,445 | 10/1985 | Kaufman | 74/579 E |
| 4,745,817 | 5/1988 | Tomita et al. | 74/579 E |

FOREIGN PATENT DOCUMENTS

| | | | |
|---|---|---|---|
| 41-22324 | 8/1966 | Japan . | |
| 58-160618 | 9/1983 | Japan | 74/595 |
| 119811 | 6/1986 | Japan | 74/579 E |
| 684897 | 12/1952 | United Kingdom | 74/579 E |
| 2066413 | 7/1981 | United Kingdom | 74/579 R |

OTHER PUBLICATIONS

"The Wear of Crankshafts with 'Lead-Bronze' Bearings", Williams et al., S.A.E. Journal, vol. 46, No. 3, Mar. 1940, p. 93.

*Primary Examiner*—Vinh Luong
*Attorney, Agent, or Firm*—Browdy and Neimark

[57] ABSTRACT

In a crank, a tri-iron tetroxide thin film is formed over at least one of the inner surface of a hole formed in a crank arm and one end of a crank pin, and the end of the crank pin is press fitted into the hole formed in the crank arm.

2 Claims, 1 Drawing Sheet

CRANK

BACKGROUND OF THE INVENTION

1. FIELD OF THE INVENTION

The present invention relates to a crank in which a crank arm is engaged with a crank pin by press fitting.

2. DESCRIPTION OF THE RELATED ART

It is known that a crank for use with an internal combustion engine is produced by engaging a crank pin with a crank arm by press fitting. In this case, in order to compensate for the joining force required to join the crank pin and the crank arm together, a thin film such as a copper plating is formed over each of the press-fitting surfaces of the crank pin and the crank arm which are brought into contact with each other when they are engaged by press fitting. Thus, the clearance between the press-fitting surfaces is filled with such a thin film to enhance the coefficient of friction therebetween and increase the tightness of press-fitting of the crank pin with respect to the crank arm, thereby increasing twist torque.

However, such a related art method involves the following problems. Although the twist torque can be increased by increasing the tightness of press-fitting, a certain limitation is imposed on the related art method since there is a risk of involving a excessive deformation or the breakage of members. Also, it has been necessary to work each member with an extremely high precision.

SUMMARY OF THE INVENTION

It is therefore an object of the present invention to solve the related art problems described above.

It is another object of the present invention to provide a crank which has a simple structure, which can be easily manufactured, and in which it is possible to increase the coefficient of friction between a crank arm and a crank pin without the need to excessively increase the tightness of press-fitting so that a twist torque can be increased.

The crank according to the present invention is constructed such that a tri-iron tetroxide (magnetite) thin film is formed over at least one of the inner surface of a hole formed in the crank arm and one end of the crank pin, and the end of the crank pin is press fitted into the hole formed in the crank arm.

Accordingly, in the present inventive construction, when the end of the crank pin is press fitted into the hole in the crank arm, the tri-iron tetroxide thin film is interposed between the outer surface of the end of the crank pin and the inner surface of the hole to increase the coefficient of friction therebetween, thereby increasing twist torque. Therefore, it is possible to rigidly join the crank pin and the crank arm together without the need to excessively increase the tightness of press-fitting. More specifically, the tri-iron tetroxide is formed on at least one of the inner surface of the hole in the crank arm and the outer surface of the end of the crank pin, and the end of the crank pin is press fitted into the hole in the crank arm. In consequence, the tri-iron tetroxide thin film or films are interposed between the outer surface of the end of the crank pin and the inner surface of the hole in the crank, and thus the coefficient of friction therebetween is increased, and therefore the twist torque can be enhanced. It is accordingly possible to rigidly join the crank pin and the crank arm together without the need to increase the tightness of press-fitting to the level required in the related art method. If the value of twist torque need not be increased to a great extent, the tightness of press-fitting may be lessened as compared with the related art method. Accordingly, restrictions on design are relaxed and easy assembly can be achieved, and the crank pin and the crank arm can be assembled with high precision without involving the deformation of the crank pin or the like.

The above and other objects, features and advantages of the present invention will become apparent from the following description of the preferred embodiment thereof, taken in conjunction with the accompanying drawings.

DESCRIPTION OF THE PREFERRED EMBODIMENT

A preferred embodiment of the present invention will be described below with reference to the accompanying drawings.

Figure 1:
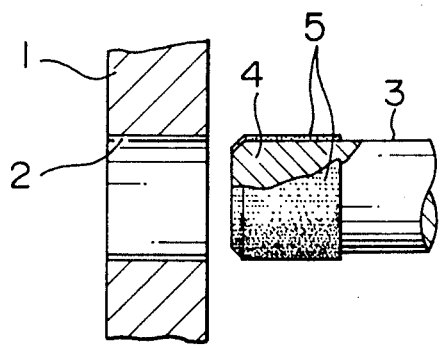
FIG. 1 is a partially sectional view of the essential portion of a preferred embodiment of a crank according to the present invention, and shows a state in which a crank pin is not engaged with a crank arm by press fitting.

Referring to FIG. 1, the illustrated crank according to the embodiment of the present invention includes a crank arm 1 in which a hole 2 is formed and a crank pin 3 having an end 4 to be axially press fitted into the hole 2 in the crank arm 1. The surface of the end 4 of the crank pin 3 is subjected to a chemical treatment (which will be described later) so that a tri-iron tetroxide ($Fe_3O_4$) thin film 5 with a thickness of about 1 $\mu$m or less is formed over the surface of the end 4. (In FIG. 1, for the purpose of illustration only, the film 5 is shown as having a thickness far greater than an actual film.) The chemical treatment typically comprises the steps of degreasing the surface of the end 4 of the crank pin 3, cleaning the degreased surface with water, subjecting the surface to a caustification treatment with caustic soda or the like, cleaning the surface with water to a sufficient extent, and washing the surface with hot water, the hot water being maintained at a temperature high enough to allow the wet surface to dry rapidly after the end 4 has been drawn out of the hot water. After being dried, the crank pin 3 is subjected to an assembly process or stored with its surface coated with an anticorrosive oil. The above-described chemical treatment itself is an application of a suitable known process for forming a tri-iron tetroxide coating layer.

Figure 2:
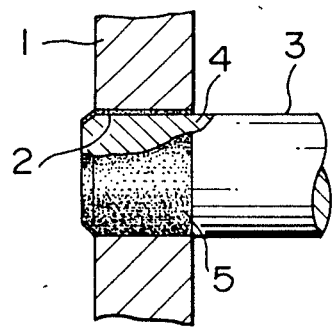
FIG. 2 is a partially sectional view similar to FIG. 1, but shows another state in which the crank pin is engaged with the crank arm by press fitting.

In this fashion, the tri-iron tetroxide thin film 5 is formed over the surface of the end 4 which is to be press fitted into the hole 2 in the crank arm 1. Then, as shown in FIG. 2, the end 4 is press fitted into the hole 2 in the crank arm 1 so that the crank pin 3 is rigidly joined to the crank arm 1.

The present inventive crank which has been assembled in the above-described manner provides the following advantage. Since the crank pin 3 is engaged with the crank arm 1 at an enhanced coefficient of friction, the joining force required to join the crank pin 3 to the crank arm 1 can be enhanced without the need to excessively increase the tightness of press-fitting of the crank pin 3 with respect to the crank arm 1, and the twist torque can be increased. Such an advantage was confirmed in the following experiment.

SCM415H (JIS) was selected as a raw material, and a crank pin having a diameter of 12 mm and a crank arm web having an outer diameter of 25 mm were made of the raw material. A press-fitting hole having a press-fitting depth of 10 mm was formed in the crank arm web. A tri-iron tetroxide thin film having a thickness of about 1 $\mu$m or less was formed over a portion of the surface of the crank pin by the above-described chemical treatment, and the surface portion coated with the thin film was press fitted into the hole formed in the crank arm. The tightness of the press-fitting at this time was about 70 $\mu$m to 80 $\mu$m, and the twist torque obtained was about 30 kg-m. From an inverse operation employing these values, it was found that the coefficient of friction was 0.4.

For the purpose of comparison, a crank pin and a crank arm were prepared by a related art method in a similar fashion, and they were engaged with each other by press fitting. As a result, the tightness of press-fitting was about 80 $\mu$m to about 100 $\mu$m, higher than the tightness required by the crank according to the present invention. However, the twist torque obtained was about only 20 kg-m, less than that achieved by the crank according to the present invention. From an inverse operation employing these values, the coefficient of friction was about 0.2, half the value achieved by the crank of the present invention.

From the above-described experiment, it was found that the present inventive crank possessed the following advantage. Although the tightness of press-fitting of the crank pin with respect to the crank arm according to the present invention was less than the tightness required by the related art crank, a very high coefficient of friction was achieved between the crank pin and the crank arm, and the twist torque was also high. Actually, no substantial deformation of the crank pin was detected and the mechanical dimension of the crank pin was found to be maintained with high precision.

In the above-described embodiment of the invention, the tri-iron tetroxide thin film is formed over the surface portion of the crank pin for convenience' sake. However, such a thin film may be formed over the inner periphery of the press-fitting hole in the crank arm or over both the surface portion of the crank pin and the inner periphery of the hole. It has been confirmed that, in these cases as well, a result similar to the above-described experimental result can be obtained.

The tri-iron tetroxide film is an extremely thin film. Accordingly, even if such a film is formed over the entire surface of the crank pin, there is no risk of hindering mounting of a bearing or similar working.

What is claimed is:
1. A crank comprising:
   a crank arm having a hole;
   a crank pin having an end to be press fitted into said hole; and
   a tri-iron tetroxide thin film formed over at least one of the inner surface of said hole and the outer periphery of said end;
   said crank being arranged such that said end of said crank pin is press fitted into said hole formed in said crank arm.
2. A crank according to claim 1, wherein said thin film has a thickness below 1 $\mu$m.

* * * * *